Patented Apr. 1, 1947

2,418,183

UNITED STATES PATENT OFFICE 2,418,183

PREVENTION OF EMULSIONS DURING EXTRACTION OF OLEFINS WITH METAL SALT SOLUTIONS

Horace R. McCombie, Torrance, and Russell L. Kittle, Long Beach, Calif., assignors to Shell Development Company, San Francisco, Calif., a corporation of Delaware No Drawing. Application November 16, 1944, Serial No. 563,810

7 Claims. (Cl. 260—677)

The present invention relates to the separation of olefins from hydrocarbon mixtures containing them and pertains more particularly to methods of decreasing the tendency toward the formation of obnoxious emulsions during the extraction of olefins from hydrocarbon mixtures with solutions of heavy metal salts capable of forming reversible complexes with said olefins.

Processes of separating olefins from hydrocarbon mixtures containing them are now in operation wherein said mixtures are contacted with solutions of heavy metal salts capable of forming reversible complexes with said olefins, whereby said olefins, and in some selective processes, only diolefins, are absorbed by said solutions. The absorbed olefins are then freed from the enriched solvent solution—usually by heating it—in a desorbing zone. Then the substantially olefin-free solution is recycled to the olefin absorbing zone. In such treatments and cyclical processes, it has been found that with certain feed stocks, and especially with cracked or pyrolyzed hydrocarbon mixtures, there occurs somewhat periodically a considerable tendency for the absorbing solutions to form froths or foams and emulsions due to heretofore unexplained causes. When such emulsions or foams are formed, frequently the only practical remedy is to clean out and discard most of the liquid, especially the metal salt solutions, from the whole extraction or absorption system. Even though part or all of the discarded solution may eventually be reclaimed, this may entail a considerable loss of the expensive metal salt solutions and valuable hydrocarbon mixtures and involves the cost of reclaiming the loss in time occasioned by the necessity of the clean-out.

It is therefore an object of the present invention to provide an improved process for the separation of olefins from those olefinic mixtures which tend to cause emulsion formation, whereby such emulsion difficulties are eliminated or greatly decreased.

Another object of this invention is to provide an improved process of separating olefins from emulsion-inducing hydrocarbon mixtures containing said olefins with solutions of heavy metal salts, whereby the induction of emulsion formation is eliminated or substantially decreased.

It is a special object of this invention to provide a process for decreasing the tendency toward the formation of obnoxious emulsions and foams during the extraction of diolefins from cracked hydrocarbon mixtures containing diolefins by means of absorbing solutions of metal salts capable of forming reversible complexes with said diolefins.

It is a further object of the present invention to provide a process for decreasing the formation and the accumulation of emulsifying materials in cyclical processes for separating olefins from olefinic cracked hydrocarbon mixtures with solutions of heavy metal salts.

Further objects and advantages of the present invention will be readily apparent from the following description.

It has now been found that at least a part of the cause of the formation of emulsions in the extraction of olefins from olefinic hydrocarbon mixtures with heavy metal salt solutions is the presence of aldehydes, particularly lower aldehydes boiling below 100° C. such as acetaldehyde, propionaldehyde, etc., in said hydrocarbon feed mixture.

Very small amounts of relatively low boiling aldehydes, such as 0.1% of acetaldehyde in the hydrocarbon mixture are especially prone to cause emulsions on contact with copper ammonium acetate solutions, particularly when said solution contains some cupric ions. It has further been found that, when aldehyde impurities are first substantially removed from olefinic hydrocarbon mixtures containing said aldehydes, there is a considerable decrease in the tendency toward emulsion formation in the subsequent extraction of olefins from the resultant aldehyde-free hydrocarbon mixture with said heavy metal salt solutions.

According to the present invention, certain olefinic hydrocarbon mixtures, especially cracked hydrocarbons, which tend to cause emulsion formation, are pretreated with aqueous alkaline solutions or other liquid capable of removing relatively low boiling aldehydes and thereafter the olefins are extracted from said treated mixtures with solutions of metal salts capable of forming reversible complexes with said olefins, i. e., capable of absorbing said olefins. The present invention is especially applicable to continuous extraction processes, since emulsion troubles are aggravated by the accumulation of the emulsion-forming aldehydes.

Hydrocarbon feeds containing the desired olefins may be obtained from various sources. The present invention is especially applicable to olefinic hydrocarbon mixtures obtained by thermal or catalytic cracking of various petroleum oils, such as crudes, residues, distillates or gases, in systems which permit the presence of at least small amounts of oxygen. While olefinic mixtures of hydrocarbons of various molecular weights may be treated according to the present invention, the emulsion and foaming difficulties arise particularly in the treatment of olefinic mixtures of hydrocarbons having relatively small numbers of carbon atoms to the molecule, such as for example, hydrocarbons of 4 or 5 carbon atoms. Thus, for example, the process of the present invention may be used to treat a mixture of hydrocarbons of 4 carbon atoms and containing the desired olefins, which mixture may be obtained from vapor phase cracking.

In the separation of hydrocarbon mixtures containing mono- and poly-olefins by solvent extraction, the separation may be between olefins and non-olefins, or between mono-olefins and poly-olefins, depending upon the solvents and conditions employed. For example, butadiene may be preferentially separated from mixtures containing it and butenes, etc. by extraction with aqueous copper ammonium acetate; while silver nitrate will extract butadiene.

Suitable absorbing solutions or suspensions are preferably aqueous, and comprise heavy metal salts, which are capable of forming reversible complex addition compounds with olefins, i. e., capable of absorbing olefins. Particularly desirable are the salts of the heavy metals of groups I and II of the periodic system, especially the metals of the right-hand sub-group of group I. The heavy metals are usually best in their monovalent form. The metal salts may be halides, e. g., chlorides bromides or cyanides, nitrates, or organic acid salts, e. g., formates, acetates, etc. Solubility-modifying compounds and the like may be included in the absorbing solutions. Ammonium compounds which form ammonium-metal salt complexes with said metal salts are usually advantageous for absorbing olefins and particularly for absorbing diolefins in preference to mono-olefins. Thus, ammonium metal salt complexes include, for example, copper ammonium formate $[Cu(NH_3)_2 OCOH]$, copper ammonium chloride, $[Cu (NH_3)_2 Cl]$, zinc ammonium cyanide, $[Zn (NH_3)_4 CN_2]$, cobaltic ammonium chloride, $[Co (NH_3)_6 Cl_3]$, cobaltous ammonium chloride, $[Co (NH_3)_6 Cl_2]$, silver ammonium chloride $[Ag (NH_3)_2 Cl]$, etc. Likewise, the metal salts may be combined with organic amines, particularly hydroxyalkylamines, such as monoethanolamine, diethanolamine, propanolamines, butanolamines, quaternary ammonium bases, etc.

In carrying out the present invention, the hydrocarbon mixture containing the desired olefin is pre-treated with an aqueous alkaline solution or other liquid capable of absorbing low boiling aldehydes. Aldehydes may also be removed in any other suitable manner. Suitable alkaline solutions include aqueous solutions of sodium, potassium and calcium hydroxides, ammonia, organic water soluble nitrogen bases, such as hydroxylamines, e. g., monoethanolamine, triethanolamine, etc., alkylene diamines, e. g., ethylene diamines, etc., arylamines, e. g., phenylene diamine tetra amino naphthalene, etc., quaternary ammonium bases, etc. Other liquids include solutions of sodium bisulfite, ammonium acetate, diethylene glycol, dipropylene glycol, ethylene glycol monomethyl ether, propylene glycol monomethyl ether, sulfolane, sulfolanol, dimethyl sulfone, diethyl sulfone, etc. It is advantageous to use, if possible, solutions of basic reacting agents which are also present in the solution used for extracting the olefins, since any of such agent which may dissolve in the hydrocarbon mixture is recovered in the absorbing solution and serves to maintain the concentration of this agent in the absorbing solution. Thus, for example, when using solutions of ammonium metal complex salts, such as copper ammonium acetate, as the absorbing solution, it is most desirable to use aqueous ammonia, such as 2 to 15% $NH_3$, for the first treatment of the hydrocarbon mixture.

This pre-treatment may be carried out in any suitable manner. The hydrocarbon mixture may be washed with the pre-treating solution batchwise or preferably continuously, such as in a counter-current contactor. Methods of contacting are conventional. Suitable amounts of the pre-treating solution may vary from about 1 to 50% more or less by volume of the hydrocarbon mixture. With solutions of 2 to 15% ammonia or its derivatives, 1 to 10% by volume treatments are generally sufficient. Lesser amounts may be used with solutions of excess ammonia.

If any of the components of the aqueous alkaline or aldehyde-absorbing solution, which may remain dissolved in the hydrocarbon mixture, are incompatible or harmful to the olefin-extracting solution, these dissolved components may be removed by means of any suitable intermediate treatment.

The separation of the olefins from the pre-treated hydrocarbon mixture, by means of the metal salt solutions may be accomplished by any of the well-known methods. The olefin absorption may be from a hydrocarbon feed in the vapor or liquid state. Absorption temperatures are usually about atmospheric or below, and if liquid phase extraction is employed, pressure at least sufficient to insure liquid condition of the hydrocarbon must be maintained. In liquid phase absorption or the continuous counter-current principle, a series of stages may be used, each stage comprising a mixer and a settler or other staging device, such as discrete stage or tray contactors, the temperature increasing and the pressure gradually decreasing through said stages. For example, in the extraction of butadiene from a $C_4$ fraction, a first stage may be operated at 5 to 15° F., and 20 to 40 p. s. i., the penultimate stage may operate at 20 to 30° F. and 10 to 20 p. s. i., and the last stage acting as a liquid phase rejection or partitioning rectifier, may operate at 65 to 100° F. and 60 to 75 p. s. i. A suitable column or columns providing a large surface contact between descending liquid absorbing solution and rising hydrocarbon vapor is generally used in vapor phase absorption and may also be used in liquid phase absorption.

After absorption, the olefins may be recovered from the olefin-enriched absorbing solution in any known manner, such as for example, by heating the solution or by reducing the pressure or by both. When butadiene is the desired olefin, the butadiene-rich absorbing solution is preferably desorbed in a desorbing zone at a relatively low pressure. The desorbing zone may comprise packed or plate column or columns having means for increasing the temperature of the metal salt solution as it nears the end of its passage through the desorbing zone.

The olefin-free lean solution of heavy metal salt is then preferably recycled to the absorbing zone.

To illustrate the effect of aldehydes and their removal from hydrocarbon mixtures on the formation of emulsions in heavy metal salt solutions which have contacted said mixtures, the following experiments were carried out:

A cracked $C_4$ hydrocarbon fraction containing butadiene and about 0.1% by weight of aldehydes was treated with 10% by volume of the various solutions with results as shown in the following table:

| Solution | Per cent Aldehyde Removed |
|---|---|
| Pure water | 35.4 |
| 1% NaOH | 86.2 |
| 40% NaOH | 88.0 |
| 10% NaHSO$_3$ | 98.5 |
| 5% NH$_4$OH—10% NH$_4$OCOCH$_3$ | 100 |
| 5% NH$_3$ | 100 |
| 10% NH$_3$ | 100 |

The emulsification test was carried out with an aqueous solution of copper ammonium acetate containing about 10.5 molar (i. e. grams mols/liter) NH$_3$, 3.0 molar total copper (including 0.3 mol cupric), and 3.5 molar acetate (calculated as acetic acid). Two samples of butadiene-containing cracked C$_4$ hydrocarbon fraction, one with 0.248 gm./100 cc. of acetaldehyde and one without aldehydes, were contacted with portions of said copper ammonium acetate solution and the two phases separated. The portions of separated copper ammonium acetate solution were heated to 150° F. for various lengths of time to age, after which periods the solutions were shaken with isopentane and the time required to effect separation was measured. The results are tabulated in the following table:

| Time of Ageing, hours | Time for separation of Emulsion, minutes | |
|---|---|---|
| | No Aldehyde | Aldehyde present |
| 0 | 1 | 1 |
| 20 | 6 | 19 |
| 91 | 25 | (¹) |

¹ No separation.

These emulsification tests illustrate that the effect of aldehydes in the hydrocarbon mixtures causes the heavy metal salt solutions to be particularly affected in continuous system, wherein ageing of the salt solutions takes place during its continued recirculation.

We claim as our invention:

1. An improved process for separating olefins from fluid mixtures containing them and aldehyde impurities comprising washing said mixture with aqueous ammonia which is a non-solvent for unsaturated hydrocarbons and thereby separating substantially all of said aldehyde impurities from said hydrocarbons and thereafter extracting said olefins from the aldehyde-free mixture with a solution of a heavy metal salt capable of forming reversible complexes with said olefins.

2. An improved process for separating olefins from fluid mixtures containing them and aldehyde impurities comprising washing said mixture with aqueous ammonia which is a non-solvent for unsaturated hydrocarbons and thereby separating substantially all of said aldehyde impurities from said hydrocarbons and thereafter extracting said olefins from the aldehyde-free mixture with an aqueous solution of an ammonium metal salt complex capable of forming reversible complexes with said olefins.

3. An improved process for separating butadiene from cracked hydrocarbon mixtures containing it and aldehyde impurities comprising washing said mixture with aqueous ammonia which is a non-solvent for unsaturated hydrocarbons and thereby separating substantially all of said aldehyde impurities from said hydrocarbons and thereafter extracting butadiene from the aldehyde-free mixture with an aqueous solution of copper ammonium acetate.

4. In a cyclical process for the extraction of olefins from a hydrocarbon mixture containing them and aldehyde impurities, wherein said olefins are absorbed in a solution of a metal salt capable of forming reversible complex addition compounds with said olefins, the resultant olefin-rich metal salt solution is treated to desorb said olefins and to regenerate said metal salt solution, and the regenerated metal salt solution is recycled to the absorbing step, the improvement comprising the step of removing said aldehydes by treating with an aldehyde solvent which is a non-solvent for unsaturated hydrocarbons and which comprises essentially aqueous ammonia prior to contacting said hydrocarbon mixture with said metal salt solution.

5. An improved process for separating olefins from fluid mixtures containing them and aldehyde impurities comprising washing said mixture with aqueous ammonia which is a non-solvent for unsaturated hydrocarbons and thereby separating substantially all of said aldehyde impurities from said hydrocarbons, and thereafter extracting said olefins from the aldehyde-free mixture with a solution of a salt of a metal of the right-hand sub-group of Group I of the Periodic Table, which metal is capable of forming reversible complexes with said olefins.

6. An improved process for separating olefins from fluid mixtures containing them and aldehyde impurities comprising washing said mixture with aqueous ammonia which is a non-solvent for unsaturated hydrocarbons and thereby separating substantially all of said aldehyde impurities from said hydrocarbons, and thereafter extracting said olefins from the aldehyde-free mixture with an aqueous copper ammonium acetate solution.

7. An improved process for separating butadiene from hydrocarbon mixtures containing it and aldehyde impurities comprising washing said mixture with aqueous ammonia which is a non-solvent for saturated hydrocarbons to remove said aldehydes and thereafter extracting said butadiene from the aldehyde-free mixture with a solution of a heavy metal salt capable of forming reversible complexes with butadiene.

HORACE R. McCOMBIE.
RUSSELL L. KITTLE.

REFERENCES CITED

The following references are of record in the file of this patent:

UNITED STATES PATENTS

| Number | Name | Date |
|---|---|---|
| 2,209,215 | Wiezevich et al. | July 23, 1940 |
| 2,370,809 | Morrell et al. | Mar. 6, 1945 |
| 1,771,350 | Ramage | July 22, 1930 |
| 2,363,903 | Smith | Nov. 28, 1944 |
| 2,369,559 | Gilliland | Feb. 13, 1945 |
| 2,005,500 | Joshua et al. | June 18, 1935 |
| 2,216,549 | Deanesly | May 16, 1938 |

FOREIGN PATENTS

| Number | Country | Date |
|---|---|---|
| 547,730 | British | Sept. 9, 1942 |
| 390,863 | British | Apr. 23, 1933 |